(12) United States Patent
Hiraguchi et al.

(10) Patent No.: US 7,227,722 B2
(45) Date of Patent: Jun. 5, 2007

(54) RECORDING TAPE CARTRIDGE WITH REEL LOCK MEMBER

(75) Inventors: Kazuo Hiraguchi, Kanagawa (JP); Wataru Iino, Kanagawa (JP); Shozo Onmori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/229,595

(22) Filed: Sep. 20, 2005

(65) Prior Publication Data
US 2006/0012917 A1   Jan. 19, 2006

Related U.S. Application Data

(62) Division of application No. 10/173,003, filed on Jun. 18, 2002, now Pat. No. 7,095,588.

(30) Foreign Application Priority Data

| Jun. 19, 2001 | (JP) | ............................. 2001-184358 |
| Jul. 4, 2001 | (JP) | ............................. 2001-203315 |
| Jul. 11, 2001 | (JP) | ............................. 2001-210183 |
| Jul. 31, 2001 | (JP) | ............................. 2001-231371 |
| Sep. 28, 2001 | (JP) | ............................. 2001-301609 |

(51) Int. Cl.
*G11B 23/02* (2006.01)
(52) U.S. Cl. ....................................... 360/132
(58) Field of Classification Search ..................... None
See application file for complete search history.

(56) References Cited

U.S. PATENT DOCUMENTS

| 4,623,105 | A |  | 11/1986 | Pertzsch et al. |
| 4,703,384 | A |  | 10/1987 | Kawada et al. |
| 5,004,180 | A | * | 4/1991 | Okamura et al. ........ 242/338.1 |
| 5,056,735 | A |  | 10/1991 | Gelardi et al. |
| 5,326,047 | A | * | 7/1994 | Takahashi et al. ....... 242/343.2 |
| 5,433,398 | A |  | 7/1995 | Sawada |
| 5,506,739 | A |  | 4/1996 | Iwahashi |
| 5,730,381 | A |  | 3/1998 | Yamada et al. |
| 5,873,537 | A |  | 2/1999 | Yamada et al. |

* cited by examiner

*Primary Examiner*—David Davis
(74) *Attorney, Agent, or Firm*—Sughrue Mion, PLLC

(57) ABSTRACT

The recording tape cartridge includes a case body formed by joining together an upper half and a lower half and a tape reel around which a recording tape is wound. The cartridge further includes a lid covering a front side of the case body, and a reel lock member which has a braking claw to be engaged with an engagement tooth provided on a flange of the tape reel and which is adapted to slide with rotation of the lid. Ribs nip the reel lock member so as to perform positional regulation, and a sliding reel lock member urging device urges the reel lock member so as to engage the braking claw with the engagement tooth. A reel lock releasing member urges the reel lock member with rotation of the lid so as to release the engagement.

5 Claims, 12 Drawing Sheets

FIG.14
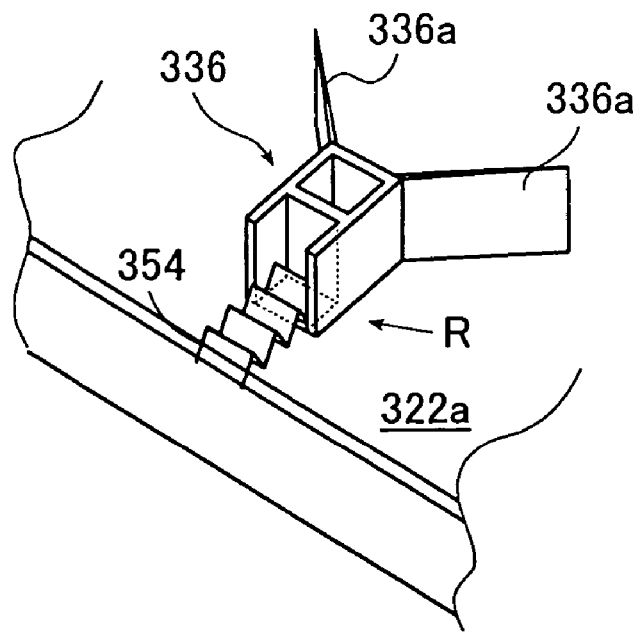
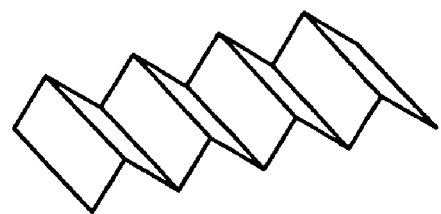
FIG.15A
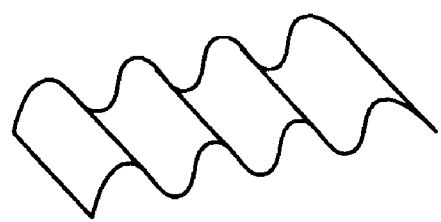
FIG.15B

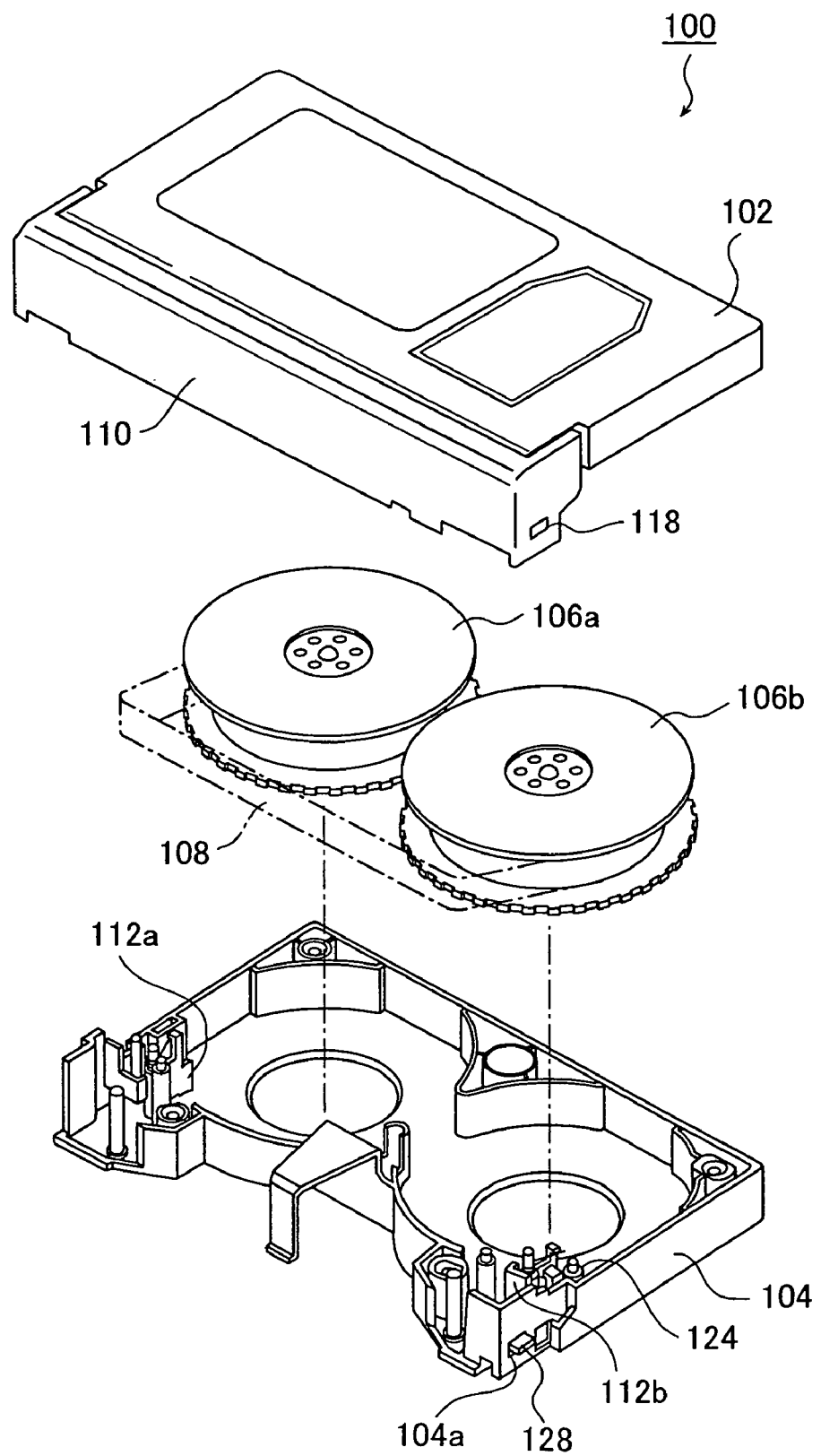

RECORDING TAPE CARTRIDGE WITH REEL LOCK MEMBER

This is a divisional of application Ser. No. 10/173,003 filed Jun. 18, 2002 now U.S. Pat. No. 7,095,588. The entire disclosure of the prior application, application Ser. No. 10/173,003, is hereby incorporated by reference.

BACKGROUND OF THE INVENTION

1. Field of the Invention

The present invention relates to a recording tape cartridge such as a magnetic tape cartridge, for example, a digital data storage (DDS) and a digital video cassette or a digital video cartridge (DVC).

More specifically, the present invention relates to a recording tape cartridge which helps to reduce the component assembly man-hours at the time of assembly and to save the trouble of separation at the time of disposal, thus reducing the load to the environment.

Still more specifically, the present invention relates to a recording tape cartridge in which it is easy to assemble and mount members forming a lock mechanism for a tape reel accommodated in a case body and which is advantageous in terms of separated recovery of the resin material at the time of disposal.

2. Description of the Related Art

Recording media cartridges conventionally used as recording media for external storage devices such as computers are roughly classified into two types: ones using magnetic disks or magneto-optical disks as the recording media (magnetic or magneto-optical disk cartridges, etc.), and ones using magnetic recording tapes such as recording tapes or magnetic tapes (recording tape cartridges such as magnetic tape cartridges). A magnetic tape cartridge is used as a large-capacity recording medium for data backup in the above-mentioned external storage device; it has a case body (also referred to as case housing) composed of upper and lower halves and rotatably accommodating a tape reel around which a magnetic tape is wound. The magnetic tape cartridge includes a cartridge of the type in which a magnetic tape is wound around a single tape reel (the so-called one-reel type magnetic tape cartridge), and a cartridge of the type in which a magnetic tape is wound around two tape reels (the so-called two-reel type magnetic tape cartridge or magnetic tape cassette).

Such magnetic or magneto-optical disk cartridge, the magnetic tape cartridge, or the magnetic tape cassette (hereinafter collectively referred to as "magnetic tape cartridge" or "recording tape cartridge") is used to store data in computers or the like; since important information is recorded therein, it is provided with various protective mechanisms in order to prevent damage to the magnetic or magneto-optical disk, generation of jamming in the magnetic tape or the recording tape, or inadvertent drawing out of the magnetic tape.

Specifically, to protect the magnetic tape when the magnetic tape cartridge is not loaded to the recording/reproducing apparatus (deck), that is, when the magnetic tape cartridge is stored or being carried about, there are provided a lid covering the front side of the magnetic tape cartridge, and a reel lock mechanism for preventing (locking) rotation of the tape reel (hereinafter simply referred to as the reel) for preventing slackening of the magnetic tape. These will be described below.

First, an ordinary conventional two-reel type magnetic tape cartridge provided with a reel lock member as a reel lock mechanism will be described.

FIG. 16 is an exploded perspective view of an ordinary conventional magnetic tape cartridge.

As shown in FIG. 16, the case body of a magnetic tape cartridge 100 is formed by joining together an upper half 102 and a lower half 104, and between them (i.e., in the case body), there is accommodated a magnetic tape 108 wound around a supply reel 106a and a take-up reel 106b.

To the front side of the upper half 102, there is mounted a lid (front cover) 110 for covering the magnetic tape 108 when the magnetic tape cartridge 100 is not being used so as to be rotatable around a pin (not shown).

To prevent slackening of the magnetic tape 108 wound around the supply reel 106a and the take-up reel 106b when the magnetic tape cartridge is not being used, there are arranged reel lock (brake) members 112a and 112b in a condition in which they are urged by springs.

Further, provided on the lower half 104 is a lock mechanism (lid lock mechanism described in detail below) which locks the lid 110 so as to prevent it from opening when the magnetic tape cartridge is not being used and which is formed by a lid lock member 124, etc. The lid lock mechanism is usually only provided for one end of the lid 110.

FIG. 17 is a perspective view of one end portion (the end portion provided with the lid lock mechanism as described below), which is the right end portion in the example shown. As shown in FIG. 17, a shaft (lid pin) 114 is provided on the inner side of a side surface of the lid 110. Then, the lid 110 is mounted to the upper half 102 so as to be rotatable around the shaft 114 as indicated by the arrow A.

Further, the shaft 114 is provided with a reel lock releasing key 116 in the form of a protrusion. Further, in the side surface of the lid 110, there is provided a hole (lid lock hole) 118 for receiving a component (lid lock key 128 described in detail below) for locking the lid 110 to prevent it from inadvertently opening when the magnetic tape cartridge is not being used.

FIG. 18 is an enlarged perspective view of a reel lock member 112b and components around the same.

As shown in FIG. 18, the central portion of the reel lock member 112b is fitted onto a pin 120 and supported so as to be rotatable around the pin 120; one end portion of it is formed by a wall-like member 113a, and the other end portion thereof is formed by a claw-like member (braking claw) 113b; the braking claw 113b is engaged with an engagement tooth 107 provided in the flange peripheral edge of the reel 106b to thereby regulate the rotation of the reel 106b and prevent the magnetic tape from slackening.

Normally, the reel lock member 112b is urged by a coil spring 122 toward a position where the braking claw 113b is engaged with the engagement tooth 107.

Further, in the vicinity of the reel lock member 112b, a lid lock member 124 is arranged. One end portion 124a of the lid lock member 124 is fitted onto a pin 126 and is thereby anchored. The lid lock member 124 is rotatable around the pin 126, and on the other end portion 124b thereof, there is provided a lid lock key 128 in the form of a protrusion. As shown in FIG. 16, this lid lock key 128 protrudes outwardly through a hole 104a provided in the side wall of the lower half 104, and is engaged with a lid lock hole 118 provided in the side wall of the lid 110 shown in FIGS. 16 and 17 to regulate (lock) the lid 110 so as to prevent it from rotating.

As shown in FIG. 18, normally (when the magnetic tape cartridge is not being used), the lid lock member 124 is urged by (the other) end portion of the coil spring 122 urging the reel lock member 112b, and the lid lock key 128 is engaged with the lid lock hole 118 of the lid 110 to thereby lock (brake) the lid 110 so as to prevent it from rotating.

When the magnetic tape cartridge 100 has been loaded to the recording/reproducing apparatus (deck, not shown), a member on the deck side pressurizes the lower portion of the end portion 124b of the lid lock member 124 in the direction indicated by the arrow B of FIG. 18, whereby the end portion 124b of the lid lock member 124 rotates in the direction indicated by the arrow C of FIG. 18. This causes the lid lock key 128 to be released from the engagement with the lid lock hole 118 of the lid 110, making the lid 110 rotatable in the direction of the arrow A of FIG. 19.

When the lid 110 thus rotates in the direction of the arrow A in FIG. 19, the shaft 114 also rotates in the direction of the arrow A as shown in FIG. 19, whereby the reel lock releasing key 116 provided on the shaft 114 urges a wall-like portion 113a of the reel lock member 112b in the direction of the arrow D. As a result, the reel lock member 112b rotates around the pin 120, and the braking claw 113b provided at one end thereof moves in the direction indicated by the arrow E in FIG. 18, whereby the engagement of the reel 106b with the engagement tooth 107 is released, thereby making the reel 106b rotatable.

Next, a conventional ordinary one-reel type magnetic tape cartridge provided with a reel lock (braking) member as a reel lock mechanism will be described.

FIG. 20 is an exploded perspective view of a conventional magnetic tape cartridge.

A magnetic tape cartridge 204 shown in FIG. 20 includes a case body formed by joining together an upper half 200 and a lower half 202; a magnetic tape 214 is wound around a tape reel (reel) 212 comprised of a reel hub 206 and an upper flange 208 and a lower flange 210 provided on top of and beneath the reel hub 206, and this reel 212 is rotatably accommodated in the case body.

In the outer peripheral edge of the upper flange 208, there are provided engagement teeth 219 adapted to be engaged with braking claws 218a and 218b of reel lock members 216a and 216b arranged on the inner surface of the upper half to regulate the rotation of the reel 212 and prevent slackening of the magnetic tape when the magnetic tape cartridge 204 is not being used. As an example of the reel lock members, the reel lock member 216a will be described. As shown in FIG. 21, it has a cylindrical fitting shaft portion 224 rotatably fitted onto a center rod 222 provided on the inner surface 220 of the upper half 200, and an engagement arm portion 226 and a releasing arm portion 228 extending radially outwards from the outer peripheral surface of the fitting shaft portion 224.

The engagement arm portion 226 is arranged so as to extend along the outer periphery of the upper flange 208 of the reel 212, and the releasing arm portion 228 is arranged so as to face an opening 232 formed in a side wall 230 of the upper half 200. Then, at the forward end of the engagement arm portion 228, there are formed braking claws 218a to be engaged with engagement teeth 219 formed in the outer peripheral edge of the upper flange 208.

In the reel lock member 216a, the braking claws 218a of the engagement arm portion 226 are urged toward the center axis of the upper flange 208 by a torsion spring 236 which is fitted onto the lower portion of the center rod 222 and whose leg portions 234a and 234b respectively abut the side wall 230 of the upper half 200 and the engagement arm portion 226. Due to this arrangement, the braking claws 218a of the reel lock member 216a are urged such that they are normally engaged with engagement teeth of the upper flange 208, whereby rotation of the reel 212 is regulated when the magnetic tape cartridge 204 is not being used, thereby preventing slackening of the magnetic tape.

As to the releasing arm portion 228, when the magnetic tape cartridge 204 is loaded to a recording/reproducing apparatus, a releasing means of this apparatus enters the case body through the opening 232 to pressurize the releasing arm portion 228, and causes the reel lock member 216a to rotate in the direction of the arrow X around the center rod 222, whereby the engagement of the braking claws 218a with the engagement teeth 219 is released.

When the magnetic tape cartridge 204 is extracted from the recording/reproducing apparatus, the pressurization of the releasing arm portion 228 by the above-mentioned releasing means is released, and the reel lock member 216a is rotated around the center rod 222 by the torsion spring 236, whereby the braking claws 218a are engaged with engagement teeth 219, and the rotation of the reel 212 is regulated (braked), thereby preventing slackening of the magnetic tape.

While the reel lock member 216a has been described as an example, the reel lock member 216b also has a similar construction and operations in a similar manner.

Next, a conventional ordinary two-reel type magnetic tape cartridge provided with a reel lock member as a reel lock mechanism of a construction different from that of the magnetic tape cartridge shown in FIG. 16 will be described.

FIG. 22 is an exploded perspective view of the construction of a conventional ordinary magnetic tape cartridge.

A magnetic tape cartridge 310 shown in FIG. 22 includes a case body which is formed by joining together an upper half 320 and a lower half 322 each having a bottom plate and a peripheral plate; accommodated between them (i.e., in the case body) is a magnetic tape 326 wound around supply and take-up tape reels (reels) 324.

Planar shifting of the reels 324 is regulated by a plurality of regulating ribs provided on the bottom plate 322a of the lower half 322 so as to be along the outer peripheries of the reels. Further, in the bottom plate of the upper half 320, there is provided an opening making it possible to check the winding amount of the magnetic tape 326 on the reels 324, and a transparent window (inspection window) 320a is provided so as to close this opening.

Further, on the inner surface of the upper half 320 (the lower surface in the drawing), a pair of reel urging plate springs (reel presser springs) 338 are provided respectively for the reels. The reel presser springs 338 are fastened to the inner surface of the upper half 320 in a cantilever-like fashion by welding, caulking, screwing, etc., and urge the reels 324 toward the lower half 322.

Mounted to the front surface (the left-hand side in the drawing) of the upper half 320 is a lid for covering and protecting the magnetic tape 326 when the magnetic tape cartridge 310 is not being used. As described below, this lid is composed of three members: an outer lid 330, an upper lid 332, and an inner lid 334, each being mounted so as to be capable of opening and closing an opening 328 of the magnetic tape cartridge.

Tape guides 346 are provided on protrusions 340 on either side of the opening 328 on the front end side (front side in the figure) of the lower half 322. The tape guides 346 guide the magnetic tape 326 fed from one reel 324 and taken up by the other reel 324 and cause the magnetic tape 326 to pass a predetermined position in the opening 328.

Further, mounted to the rear end (the back side in the drawing) of the lower half 322 is a reel lock member (also referred to as the tape reel lock member) having tape reel anchoring arms (hereinafter simply referred to as the anchoring arms) 336a and a slide body portion 336b. The slide body portion 336b is slidably held by a pair of guide ribs provided on the bottom plate 322a of the lower half 322. As described below, this reel lock member 336 is urged by a compression coil spring 342, whereby the anchoring arms 336a are engaged with engagement teeth 324a formed in the outer peripheries of the lower flanges of the reels 324, thereby preventing inadvertent rotation of the reels 324. This helps to prevent slackening, etc. of the magnetic tape 326.

Of the outer lid 330, the upper lid 332, and the inner lid 334 mounted to the upper half 320, the outer lid 330 has a flat portion and a side plate, on the inner side of which there is provided a lock pin 348. Then, a lid lock member 344 for anchoring the lock pin 348 of the outer lid 330 in the closed state is rotatably mounted to a side wall portion 322c which is a part of the peripheral wall of the lower half 322. This lid lock member 344 is urged so as to anchor the lock pin 348 by a lid lock spring (not shown) that is also mounted to the lower half 322.

Further, mounted to the lower half 322 is an erroneous erasure preventing plug 352 for preventing the data recorded on the magnetic tape 326 from being erroneously erased. On one side surface (back side surface in the figure) of the erroneous erasure preventing plug 352, there is provided a claw portion, which, when mounted to the lower half 322, protrudes outwards through an opening provided in the peripheral wall of the upper half 320.

Then, by operating this claw portion from outside, it is possible to move the erroneous erasure preventing plug 352 along a guide rib standing upright on the bottom plate 322a of the lower half 322. With the bottom surface of this erroneous erasure preventing plug 352, it is possible to close and open an inspection hole provided in the bottom plate of the lower half 322; an apparatus, such as a recording apparatus, can read the condition of this inspection hole, making a judgment as to whether it is possible to write new data to the magnetic tape 326.

The lower half 322 has a rectangular bottom plate 322a, which rotatably supports the pair of reels 324 around which the magnetic tape 326 is wound, and which has reel spindle insertion holes 322b for inserting reel spindles (not shown) of the recording/reproducing apparatus into the reels 324 to rotate the reels 324 when the magnetic tape cartridge 310 is loaded to the recording/reproducing apparatus.

Further, the bottom plate 322a has protrusions 340 extending forwardly from the right and left ends; on the right and left protrusions 340, there are provided column-like tape guides 346 which extend vertically from the bottom plate 322a and which guide the magnetic tape 326 stretched between the reels 324 to the front side of the case body (cartridge case) by way of a predetermined route. Between the protrusions 340, the lower half 322 has no bottom plate 322a, forming an opening 328 of the-case body.

The upper and lower halves 320 and 322, the outer lid 330, the upper lid 332, the inner lid 334, the upper and lower flanges of the tape reels 324, etc. are formed by injection molding. Apart from these, components formed by injection molding are used in the magnetic tape cartridge 310 as appropriate.

As described above, in the conventional magnetic tape cartridge 100 shown in FIGS. 16 through 19, the same spring (the coil spring 122) is used both as the reel lock spring for urging the reel lock member 112b and as the lid lock spring for urging the lid lock member 124; although this is advantageous from the viewpoint of reducing the number of parts, it involves more work compared with the case where the same spring is used both as the reel lock spring and as the lid lock spring when the assembly of the parts and the separated recovery thereof are taken into account. When the assembly takes a lot of work, the production efficiency deteriorates and the production cost increases. Further, the separated recovery of the parts is a bother, and it is likely that the components are recovered without being re-utilized; they will be destroyed before being disposed of, thus adversely affecting the environment.

Also, in the magnetic tape cartridge 204 having the reel lock mechanism as shown in FIGS. 20 and 21, its assembly requires the following complicated operations: the torsion spring 236 is previously fitted onto the center rod 222 with the inner surface of the upper half 200 facing upwards; further, the fitting shaft portion 224 of the reel lock member 216a or 216b is fitted onto the center rod 222, and the leg portions 234a and 234b of the torsion spring 236 are made to respectively abut the side wall 230 of the upper half 200 and the engagement arm portion 226 and, further, the braking claws 218a and 218b are engaged with the engagement teeth 219. Thus, the assembly is by no means easy.

Further, generally speaking, the magnetic tape cartridge is formed as a composite structure in which various metal components and resin components are combined in accordance with the requisite performance and configuration for the components or members. Examples of the synthetic resin used include: (1) resin molding of POM (polyacetal) for components of which wear resistance is required, (2) resin molding of PS (polystyrene) with Si (silicon) added in consideration of cost/performance, and (3) ABS (acrylic-nitrile-butadiene-styrene) resin in consideration of strength, ABS resin with PC (polycarbonate) added thereto, PC, PC with glass fiber added for reinforcement, etc.

For the spring members, etc., various metal materials are used in accordance with the requisite properties for the components. Also, regarding the members or components forming the reel lock mechanism, the reel lock members 216a and 216b, the center rod 222, etc. are formed of a resin material, such as POM, PAR (polyarylate), PC, or ABS resin, whereas the torsion spring 236 is formed of a spring metal material such as SUS (stainless steel) . As for the other members, they are formed of synthetic resin, metal, or a composite material of metal and synthetic resin.

Thus, when the conventional magnetic tape cartridge is disassembled after use, and the components are divided into resin materials and metal materials for separate recovery, a rather complicated operation requiring considerable work and cost is involved to effect separate recovery for recycling for each material.

Recently, with increasing environmental awareness, attention has come to be focused on the influence of various wastes such as plastics or composite materials, and it is becoming increasingly important to involve little waste or not to cause contamination of the air, water, and earth even with the disposal, that is, to impose little load on the environment. In view of this, industrial products are required to be of a construction that allows application of recycling system.

In the case of the magnetic tape cartridges as shown in FIGS. 16 through 19 and FIG. 22, most of the components including the case body are formed of plastic, and metal material is only used where relatively large strength is required or where resiliency is required. Specifically, in these magnetic tape cartridges, the urging springs of the reel lock mechanism and the lid lock mechanism, that is, the reel lock springs and the lid lock springs, are formed of metal from the viewpoint of durability.

However, when disposing of such a magnetic tape cartridge after use, it is necessary to disassemble the magnetic tape cartridge and to extract the metal springs; this operation requires manpower.

SUMMARY OF THE INVENTION

The present invention has been made in view of the above problems or matters in the prior art. The main object of the present invention is to provide a recording tape cartridge which helps to eliminate the above problems in the prior art, reduce waste, and decrease load to the environment and whose basic performance and productivity are equivalent to or higher than those of the conventional recording tape cartridges such as the magnetic tape cartridges.

More specifically, it is a first object of the present invention to provide a recording tape cartridge which allows easy incorporation of reel lock member urging means, such as a reel lock spring, for use in a reel lock mechanism for preventing inadvertent rotation of a tape reel around which a recording tape such as a magnetic tape is wound and which also allows easy separate recovery.

A second object of the present invention is to provide a recording tape cartridge which allows easy assembly and mounting of members forming a reel lock mechanism and which is advantageous from the viewpoint of separate recovery of resin materials.

A third object of the present invention is to provide a recording tape cartridge in which urging means, such as urging springs, of a reel lock mechanism and/or a lid lock mechanism, which have been conventionally comprised of metal components, are formed of the same resin (plastic) material as that forming the main components of the reel lock mechanism and/or the lid lock mechanism, whereby a reduction in assembly man-hour is achieved, and the trouble of separation at the time of disposal is saved.

It is a fourth object of the present invention to provide a recording tape cartridge in which reel lock member urging means, such as a reel lock spring, of the recording tape cartridge is formed of a material that requires no separation at the time of disposal, which allows assembly with an efficiency equivalent to or higher than that of the conventional constructions, and in which such change in construction does not adversely affect the basic performance of the recording tape cartridge.

To achieve the above main object and the specific first through fourth objects of the present invention, the present inventors have found out, after careful study, that there exist various ways of coping with the above problems in relation to achieving a reduction in waste, that is, a reduction in load to the environment regarding the recording tape cartridge such as the magnetic tape cartridges of the above-described various constructions, and that, regarding the case body of a recording tape cartridge, it is possible to propose a construction advantageous for separation into different materials and, specifically, a construction in which the reel lock spring is formed of resin. Further, in completing the present invention, the present inventors have found out what is required in this case is the possibility of assembly with an efficiency equivalent to or higher than that for recording tape cartridge of the conventional constructions, and that the change in the material of the reel lock spring should not adversely affect the basic performance of the recording tape cartridge.

In order to attain the objects described above, a first aspect of the present invention provides a recording tape cartridge having a case body formed by joining together an upper half and a lower half, a tape reel which is accommodated in the case body and around which a recording tape is wound, a lid rotatably provided on the upper half and covering a front side of the case body, a reel lock member which has a braking claw to be engaged with an engagement tooth provided on a peripheral edge of a flange of the tape reel and which is adapted to slide with rotation of the lid, ribs provided in the vicinity of a side wall of the lower half so as to be on either side of the reel lock member and to perform positional regulation on its sliding, reel lock member urging device for urging the reel lock member so as to cause the braking claw to be engaged with the engagement tooth, and a reel lock releasing member provided in the lid in order to urge the reel lock member with rotation of the lid so as to release engagement of the braking claw and the engagement tooth.

And, in order to attain the main and second objects described above, the second aspect of the present invention provides a recording tape cartridge comprising a case body formed by joining together an upper half and a lower half, a tape reel which is accommodated in the case body and around which a recording tape is wound, a fitting shaft portion rotatably fitted onto a center rod standing upright on an inner surface of the upper half, reel lock member formed by providing radially on an outer peripheral surface of the fitting shaft portion a brake releasing arm portion and a brake arm portion having at its top end a braking claw to be engaged with an engagement tooth formed in a peripheral edge of an upper flange of the tape reel and reel lock member urging means which is provided so as to extend between an anchoring portion standing upright on the inner surface of the upper half and the brake arm portion and which is adapted to urge the reel lock member so as to cause the braking claw to be engaged with the engagement tooth.

Preferably, the reel lock member urging means is a reel lock spring comprised of a plate spring member.

Preferably, the braking releasing arm portion of the reel lock member is arranged so as to face an opening formed in a side wall of the upper half, and wherein, when the recording tape cartridge is loaded to a recording/reproducing apparatus, releasing means on a side of the recording/reproducing apparatus enters through the opening and is pressurized to thereby release engagement of the engagement tooth and the braking claw by the reel lock member.

In order to attain the main and third objects described above, the third aspect of the present invention provides a recording tape cartridge comprising a case body formed by joining together an upper half and a lower half, a tape reel which is accommodated in the case body and around which a recording tape is wound, a lid rotatably provided on the upper half and covering a front side of the case body, a reel lock member which has a braking claw to be engaged with an engagement tooth provided in a peripheral edge of a flange of the tape reel and which is adapted to effect or release, with rotation of the lid, engagement of the braking claw with the engagement tooth to thereby prevent or permit rotation of the tape reel, reel lock member urging means for urging the reel lock member so as to cause the braking claw to be engaged with the engagement tooth, a lid lock member which has an engagement claw to be engaged with an engagement hole provided in an end portion of the lid and which is adapted to effect or release, upon loading of the recording tape cartridge to a recording/reproducing apparatus, engagement of the engagement claw with the engagement hole to thereby prevent or permit rotation of the lid, and lid lock member urging means for urging the lid lock member so as to cause the engagement claw to be engaged with the engagement hole, wherein the reel lock member and the reel lock member urging means and/or the lid lock member and the lid lock member urging means are formed into integral units by using a resin.

Preferably, the reel lock member and the reel lock member urging means and/or the lid lock member and the lid lock member urging means are formed into integral units by using the resin having an appropriate degree of elasticity.

Further, in order to attain the main and fourth objects described above, the fourth aspect of the present invention provides a recording tape cartridge comprising a case body formed by joining together an upper half and a lower half, a tape reel which is accommodated in the case body and around which a recording tape is wound, a reel lock member slidably inserted into the case body and having a braking claw to be engaged with an engagement tooth provided in a peripheral edge of a flange of the tape reel, and reel lock member urging means for urging the reel lock member, wherein the reel lock member urging means is formed of a resin.

Preferably, reel lock member urging means is a reel lock spring formed by folding a sheet-shaped resin material in a zigzag fashion.

In the present invention, the "upper side" refers to the side where the upper half is situated and the "lower side" refers to the side where the lower half is situated.

BRIEF DESCRIPTION OF THE DRAWINGS

In the accompanying drawings:

FIG. 14 is an enlarged perspective view of the vicinity of a portion accommodating the reel lock member shown in FIG. 13;

FIGS. 15A and 15B are perspective views showing reel lock springs;

FIG. 16 is an exploded perspective view of a conventional ordinary two-reel type magnetic tape cartridge;

DESCRIPTION OF THE PREFERRED EMBODIMENTS

Preferred embodiments of the recording tape cartridge of the present invention will now be described in detail with reference to the accompanying drawings. Hereinafter, the recording tape cartridge of the present invention is described representatively as the magnetic tape cartridge, however it should not be limited to this case.

First, a magnetic tape cartridge according to a first embodiment of the present invention will be described with reference to FIGS. 1 through 6 and FIGS. 16 through 19.

In the following, a description of the members or components which are the same as those of the two-reel type magnetic tape cartridge shown in FIG. 16 will be omitted, and the description will be focused on the components of a reel lock mechanism, such as a reel lock member, and the components of a lid lock mechanism, such as a lid lock member. However, this should not be construed restrictively. It is naturally also possible to remove the components characteristic of the present invention and adopt the components of the magnetic tape cartridge shown in FIG. 16, using the same or different members or components.

Figure 1:
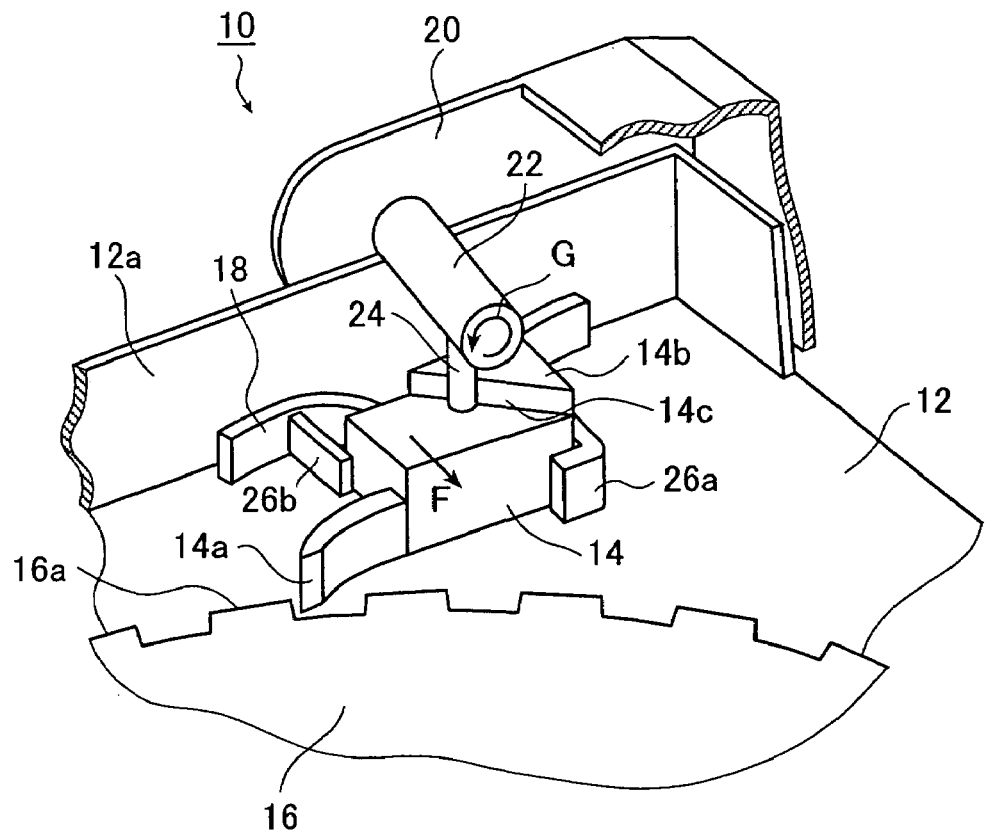
FIG. 1 is a perspective view of an example of the construction of a reel lock member, etc. according to an embodiment of a magnetic tape cartridge of the present invention.

FIG. 1 is a perspective view of a magnetic tape cartridge according to the first embodiment of the present invention, showing a construction example of a reel lock member provided in a lower half and of a reel lock releasing mechanism provided in a lid. In FIG. 1, the lid lock member and an upper half are omitted in order to prevent the drawing from becoming too complicated. The lid lock member will be described below.

In FIG. 1, a reel lock member 14 is arranged at a predetermined position on the bottom surface of a lower half 12 of a magnetic tape cartridge 10. The reel lock member 14 has a braking claw 14a, which is engaged with an engagement tooth 16a provided on a reel flange 16 to thereby regulate the rotation of the reel flange 16.

Between a lower half side surface 12a and the reel lock member 14, there is arranged a reel lock spring (reel lock member urging means) 18, which urges the reel lock member 14 so as to cause the braking claw 14a to be engaged with the engagement tooth 16a (i.e., in the direction indicated by an arrow F).

The reel lock spring 18 is comprised of a plate spring, which can be preferably formed of a PET (polyethylene terephthalate) resin sheet, a PC (polycarbonate) resin sheet, a polyvinyl chloride resin sheet, etc. for general purpose use. As long as it maintains spring property, it may also be a band-shaped molding of various engineering plastics including ABS (acrylonitrile butadiene) resin, PS (polystyrene) resin, and nylon.

This plate spring member may be formed of metal, resin or the like and there is no particular restriction in this regard. When, in particular, a plate spring member of resin is used, it can be separated together with the reel lock member 14 formed of a resin material, and there is no need to separate metal material from resin material for recovery, which is advantageous from the viewpoint of separated recovery.

The form of the reel lock member urging means is not restricted to a plate spring; it may be also comprised of a coil spring of metal or resin or a spring of some other shape. Alternatively, it is possible to adopt an arbitrary elastic body as long as it can urge the reel lock member 14.

Further, provided in the upper half (not shown) is a lid 20, which is rotatable around a shaft (lid pin) 22. The shaft 22 is provided with a reel lock releasing key (reel lock releasing member) 24, which is a protrusion-like member.

Further, a step 14b is provided on top of the reel lock member 14, and an inclined surface 14c is provided on the portion of the step against which the reel lock releasing key 24 of the lid 20 abuts.

When the magnetic tape cartridge 10 is loaded to a recording/reproducing apparatus (deck), the lid 20 rotates around the shaft 22 due to the action of a mechanism on the deck side. At this time, the shaft 22 rotates in the direction indicated by an arrow G in FIG. 1. With the rotation of the shaft 22, the reel lock releasing key 24 also rotates and pushes the step 14b of the reel lock member 14; due to the inclined surface 14c, the reel lock member 14 slides in the direction of the lower half side surface 12a (the direction opposite to the arrow F in FIG. 1) against the resilient of the reel lock spring 18, and the braking claw 14a is detached from the engagement tooth 16a to release the engagement, enabling the reel flange 16 to rotate.

Further, to cause the reel lock member 14 to slide in a fixed direction, there are provided on the bottom surface of the lower half 12 ribs 26a and 26b, which hold the reel lock member 14 between them to regulate the sliding direction.

The operation of the reel lock member 14 and the reel lock releasing mechanism constructed as described above will now be described with reference to a plan view.

Figure 2:
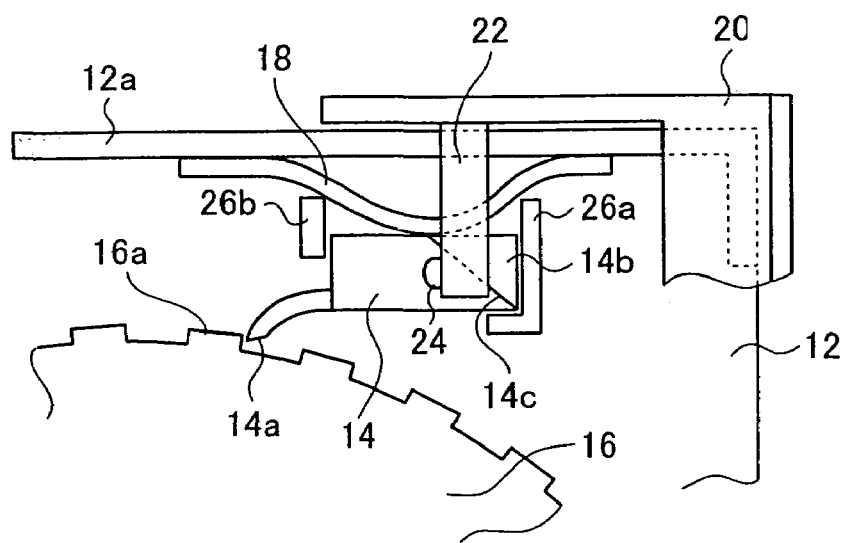
FIG. 2 is a plan view showing the reel lock member of FIG. 1 and the portion around the same.

FIG. 2 is a plan view of the reel lock member 14 of FIG. 1 and the portion around the same.

Like FIG. 1, FIG. 2 shows the state in which the magnetic tape cartridge 10 is not being used; the lid 20 covers the front side (the right-hand side in the drawing) of the magnetic tape cartridge 10 to protect the magnetic tape. At this time, the reel lock member 14 is urged toward the reel flange 16 by the reel lock spring 18, and the braking claw 14a is engaged with an engagement tooth 16a of the reel flange 16 to regulate the rotation of the reel flange 16.

Figure 3:
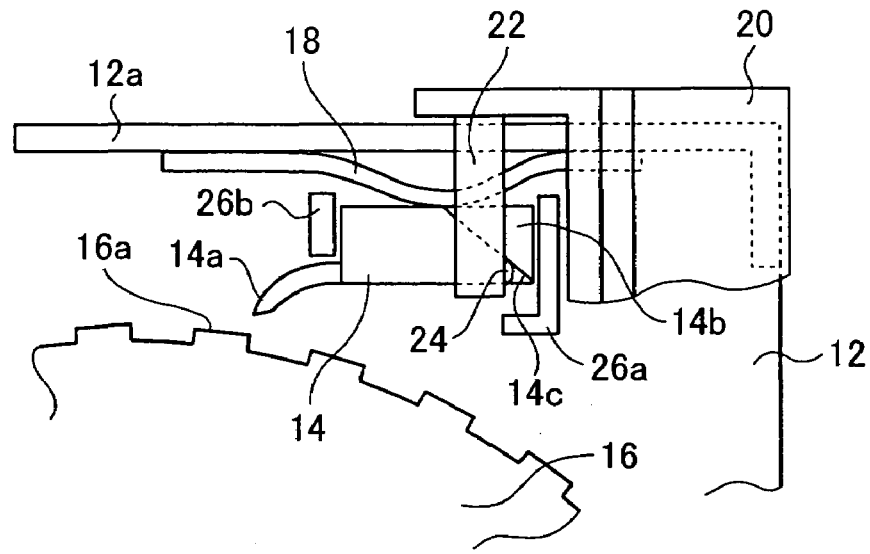
FIG. 3 is a plan view showing a condition in which the lid of FIG. 2 has rotated to release reel lock.

FIG. 3 is a plan view showing the condition in which the magnetic tape cartridge 10 has been loaded to the deck and in which the lid 20 has rotated around the shaft 22. As shown in FIG. 3, as a result of the rotation of the lid 20 around the shaft 22, the portion which has covered the front side of the magnetic tape cartridge 10 now covers the lower half 12.

At this time, with the rotation of the shaft 22, the reel lock releasing key 24 also rotates to pressurize the inclined surface 14c of the step 14b of the reel lock member 14. The inclined surface 14c is pushed to the right as seen in FIG. 3 by the reel lock releasing key 24, so that the inclined surface 14c glides while abutting the reel lock releasing key 24, and the reel lock member 14 slides toward the lower half side surface 12a (upwardly in the drawing) while depressing the reel lock spring 18. As a result, the braking claw 14a is detached from the engagement tooth 16a and the reel lock is released, enabling the reel flange 16 to rotate.

In this way, in contrast with the conventional construction in which the same spring is used as both the reel lock spring and the lid lock spring, this embodiment adopts the above-described construction, in which the reel lock spring is formed as a separate component, whereby, when incorporating the reel lock spring into the lower half, the reel lock spring has only to be put from above the lower half, thus, substantially facilitating the incorporation. Further, also at the time of disassembly, it can be easily detached.

In this embodiment, there is no particular limitation regarding the lid lock spring, which has also served as the reel lock spring in the conventional construction; any type of spring can be suitably applied as long as the same function as that of the conventional lid lock mechanism can be achieved.

Figure 4:
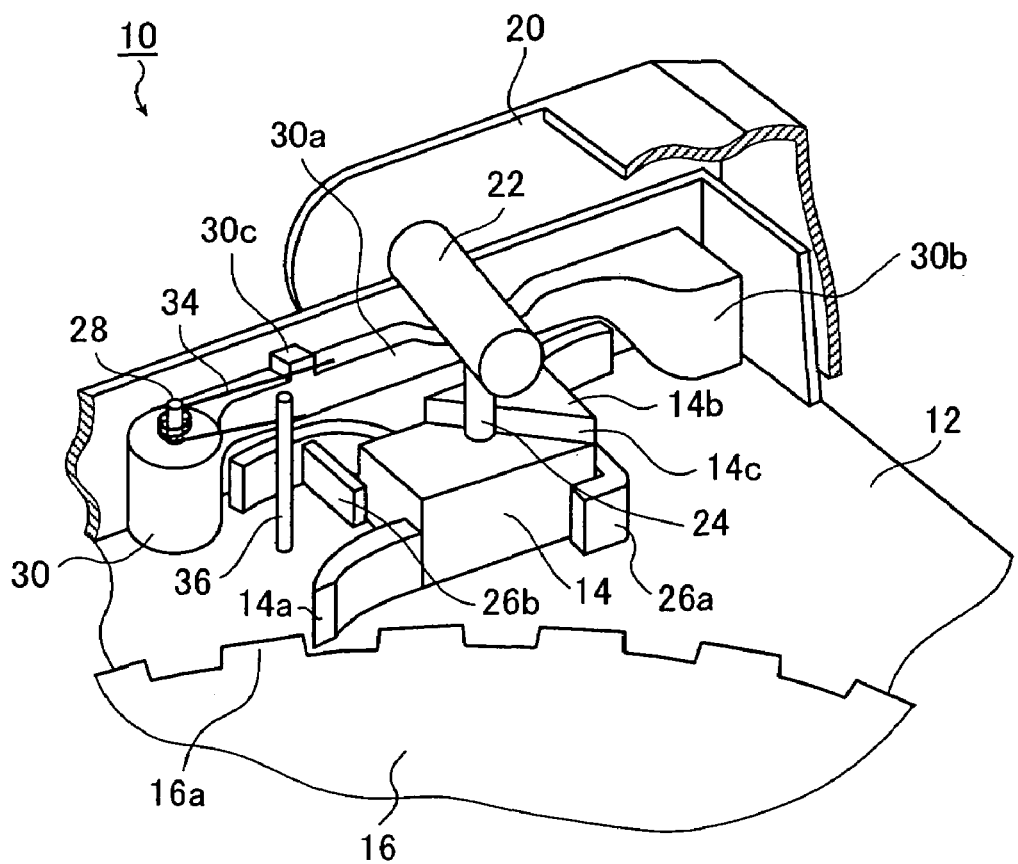
FIG. 4 is a perspective view of an example of a lid lock member corresponding to the portion of FIG. 1.

FIG. 4 shows an example of such modification. In the example shown in FIG. 4, a pin 28 stands upright in close vicinity to the reel lock member 14 of the lower half 12, and a lid lock member 30 is rotatably fitted onto the pin. The lid lock member 30 has an arm portion 30a extending under the shaft 22 of the lid 20 and an end portion 30b equipped with a lid lock key (not shown).

Figure 5:
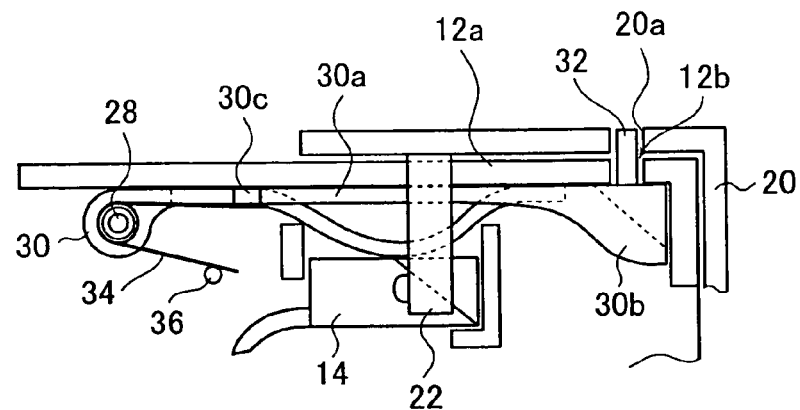
FIG. 5 is a plan view of a portion corresponding to FIG. 4.

FIG. 5 is a plan view corresponding to FIG. 4. As shown in FIG. 5, the lid lock member 30 has at its end portion 30b a lid lock key 32 in the form of a protrusion. This lid lock key 32 extends outwardly through a hole 12b provided in the lower half side wall 12a and is fitted into a hole (lid lock hole) 20a provided in the lid 20, whereby the lid 20 is locked so as not to rotate.

As shown in FIGS. 4 and 5, a lid lock spring 34 is provided to the pin 28 in order to urge the arm portion 30a of the lid lock member 30 so as to cause the lid lock key 32 to be fitted into the lid lock hole 20a. One end of the lid lock spring 34 is anchored to a protrusion 30c provided on the arm portion 30a of the lid lock member 30, and the other end thereof is anchored to a pin 36 standing upright on the bottom surface of the lower half 12, thereby urging the arm portion 30a toward the lower half side surface 12a.

Figure 6:
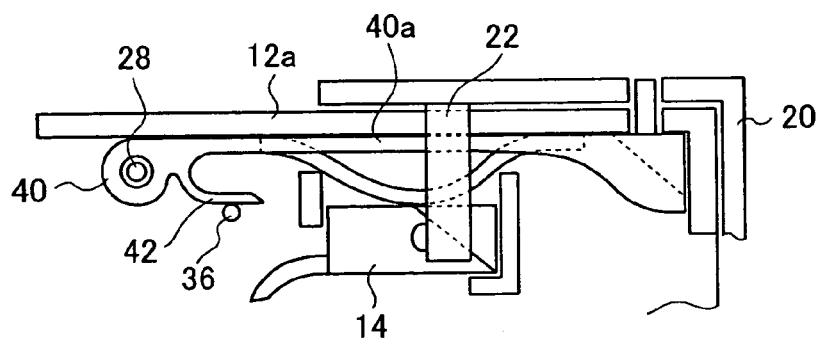
FIG. 6 is a plan view, similar to FIG. 5, showing another example of a lid lock member used in the present invention.

While the lid lock spring 34 shown in FIGS. 4 and 5 is a coil spring, this should not be construed restrictively. For example, it is also possible, as shown in FIG. 6, to rotatably fit a lid lock member 40 onto the pin 28 and to provide the lid lock member 40 with an elastic deforming portion 42 formed of the same resin as the lid lock member 40 and extending in a branch-like fashion; the elastic deforming portion 42 is supported by the pin 36, whereby the arm portion 40a is urged in the direction of the lower half side surface 12a. In this construction, both the reel lock spring and the lid lock spring can be formed of resin, which is advantageous from the viewpoint of separated recovery of the materials.

As described above in detail, in this embodiment, ribs holding the reel lock spring and the reel lock member between themselves for positional regulation are arranged at appropriate positions in the lower half, whereby, when incorporating the reel lock spring into the lower half, it is only necessary to put the spring on the lower half from above, using the ribs as a guide, thus facilitating the incorporation.

Further, at the time of disassembly, it can be easily detached. Thus, it is possible to save the trouble of incorporation and separate component recovery; it is also possible to re-utilize the components.

The basic construction of the magnetic tape cartridge of the first embodiment of the present invention is as described above.

Next, a magnetic tape cartridge according to a second embodiment of the present invention will be described with reference to FIGS. 7 and 8 and FIGS. 20 and 21.

The present invention is applied to a magnetic tape cartridge having a magnetic tape and a case body rotatably accommodating the magnetic tape. More specifically, the present invention is applicable to any magnetic tape cartridge of the type in which a tape reel (reel) around which a magnetic tape is wound is set at a predetermined position such that the magnetic tape can be extracted from the case body or run, and in which, in order to prevent slackening of the magnetic tape when the magnetic tape cartridge is not being used, a reel lock (braking) member having a braking claw adapted to be engaged with an engagement tooth provided on the reel flange is mounted to the upper half or the lower half.

Further, in the magnetic tape cartridge of the present invention, the term "case body" refers not only to the upper and lower halves, which are the main components, but also to various other members including the members mounted to the upper half or the lower half, the cover opened when extracting the magnetic tape wound around the reel and the opening/closing mechanism for the cover, and the member for retaining the leading end of the magnetic tape. For example, in the magnetic tape cartridge shown in FIG. 20, the other members are comprised of a plurality of members including the cover, erroneous erasure preventing plug, tape engagement member, and other metal components, the upper and lower halves being combined with each other.

In the magnetic tape cartridge of the second embodiment of the present invention, the reel accommodated in the case body has a reel hub around which a magnetic tape is wound, and upper and lower flanges fitted onto the top and bottom of the reel hub, the upper flange having in its outer peripheral edge engagement teeth to be engaged with a braking claw of the reel lock member. Further, the reel lock member has a fitting shaft portion rotatably fitted onto a center rod standing upright on the inner surface of the upper half, and a braking releasing arm portion and a brake arm portion provided on the side wall of the outer periphery of the fitting shaft portion.

The braking releasing arm portion is arranged so as to face an opening provided in the side wall of the upper half; when the magnetic tape cartridge is loaded to the recording/reproducing apparatus, a releasing means on the recording/reproducing apparatus side enters through the opening and is pressurized, thereby releasing the engagement of the engagement tooth and the braking claw due to the reel lock member.

Further, the brake arm portion protrudes from the side wall of the outer periphery of the fitting shaft portion, and is arranged so as to extend along the outer periphery of the upper flange of the reel, having at its forward end a braking claw to be engaged with an engagement tooth formed in the outer peripheral edge of the upper flange. The braking claw is urged toward the center axis of the upper flange, whereby the braking claw and the engagement tooth of the upper flange are normally engaged; the rotation of the reel is regulated when the magnetic tape cartridge is not being used, thus preventing slackening of the magnetic tape.

In the magnetic tape cartridge of this embodiment, by a reel lock member urging means provided between an anchoring portion standing upright on the inner surface of the upper half and the brake arm portion, for example, a plate spring member, the reel lock member is urged so as to cause the braking claw to be engaged with the engagement tooth, that is, in the brake engaging direction. Examples of the plate spring member include a plate spring member with a substantially arcuate sectional configuration having at its ends an anchoring cutout groove into which a fitting anchoring portion formed on the anchoring portion is fitted and a braking cutout groove into which the brake arm portion is to be fitted, and a plate spring linearly cut. By the rotation of the fitting shaft portion provided between the anchoring portion and the brake arm portion and using the center rod as the rotation center, the plate spring member undergoes elastic deformation to generate an elastic force, by means of which the braking claw is urged toward the center axis of the upper flange to be engaged with the engagement tooth. This plate spring member is preferably comprised of, for example, PET (polyethylene terephthalate), PC, or polyvinyl chloride having sheet-like configurations and which are used for general purpose. Further, band-shaped moldings of other various engineering plastics, such as ABS, PS, or nylon are also applicable as long as they can maintain spring property.

This plate spring member may be comprised of metal, resin or the like, and there is no particular limitation regarding its material. In particular, when using a plate spring member formed of resin, it can be separated together with the reel lock member formed of resin material, and there is no need for separate recovery of metal material and resin material, which is advantageous from the viewpoint of separate material recovery.

In the magnetic tape cartridge of this embodiment, the reel lock mechanism comprised of the reel lock member, the plate spring member, and the center rod is appropriately arranged on the inner surface of the upper half according to the position of the tape reel inside the case body, the number of reels accommodated, the pressurizing direction, etc. For example, in the magnetic tape cartridge of the type shown in FIG. 20, two of them are arranged so as to be opposed to the two corner portions of the case body.

In assembling the magnetic tape cartridge of this embodiment, the fitting shaft portion of the reel lock member is fitted onto the center rod, with the inner surface of the upper half facing upwards, and the plate spring member is fitted onto the anchoring portion and the brake arm portion; further, the braking claw is engaged with the engagement tooth of the upper flange, whereby it is possible to mount the reel lock mechanism, and the assembly operation is facilitated.

Further, when disassembling the magnetic tape cartridge, the plate spring member is detached from the anchoring portion and the brake arm portion to thereby remove the plate spring member, and the fitting shaft portion is pulled out of the center rod, whereby it is possible to separate the reel lock member, and the disassembly is facilitated. In addition, forming the spring member of resin material is advantageous when separating the components into resin and metal materials for separate recovery for recycle purposes at the time of disassembly or disposal of the magnetic tape cartridge.

In the following, a construction example of the magnetic tape cartridge of the second embodiment of the present invention will be described with reference to FIG. 7.

Figure 20:
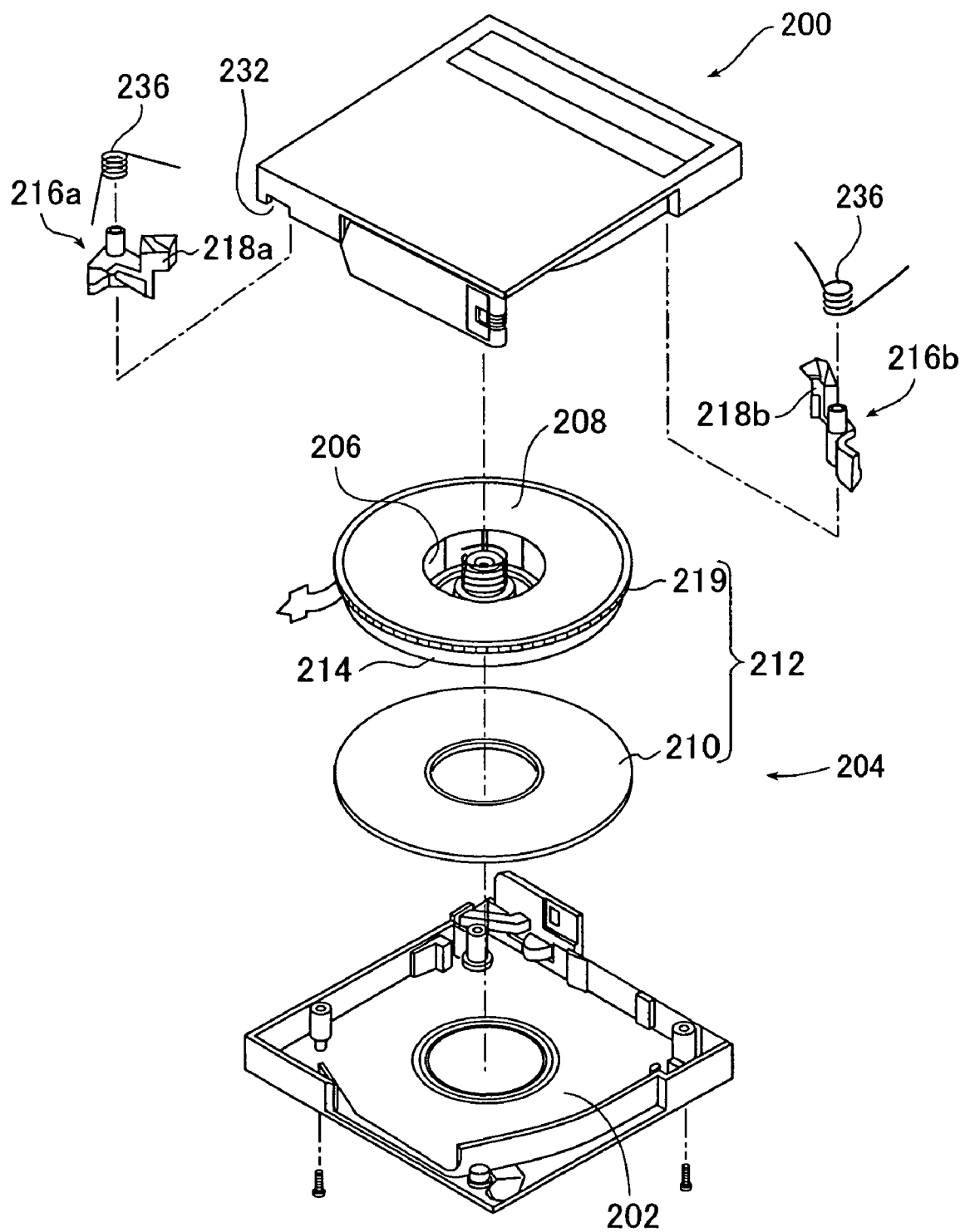
FIG. 20 is an exploded perspective view schematically showing the construction of a conventional one-reel type magnetic tape cartridge.
Figure 21:
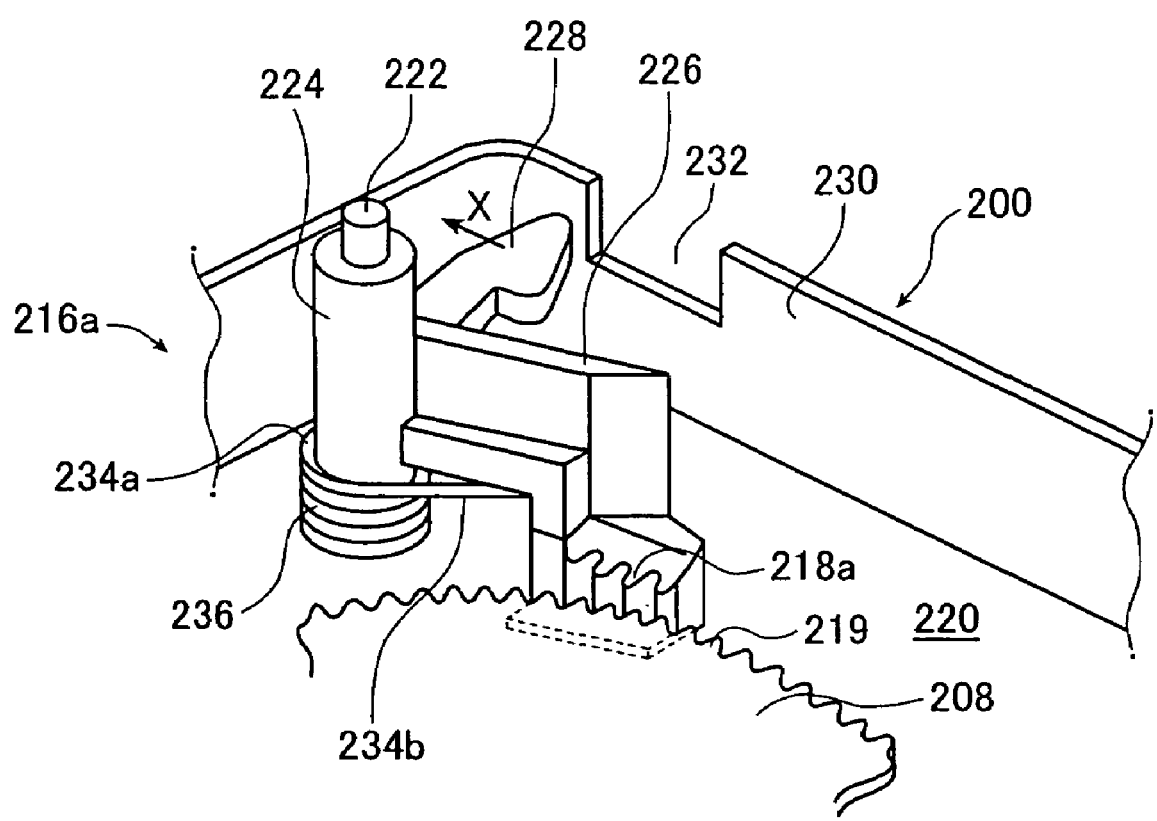
FIG. 21 is a diagram illustrating the reel lock mechanism in the magnetic tape cartridge shown in FIG. 20.

In this embodiment, the members or components which are the same as those of the one-reel type magnetic tape cartridge shown in FIG. 20 may be comprised of the same or different members or components. In the following, a detailed description of such members or components will be omitted, and the description will be focused on the reel lock member, the engagement teeth provided on the upper flange, and the plate spring member serving as the reel lock member urging means. Of course, this should not be construed restrictively.

Figure 7:
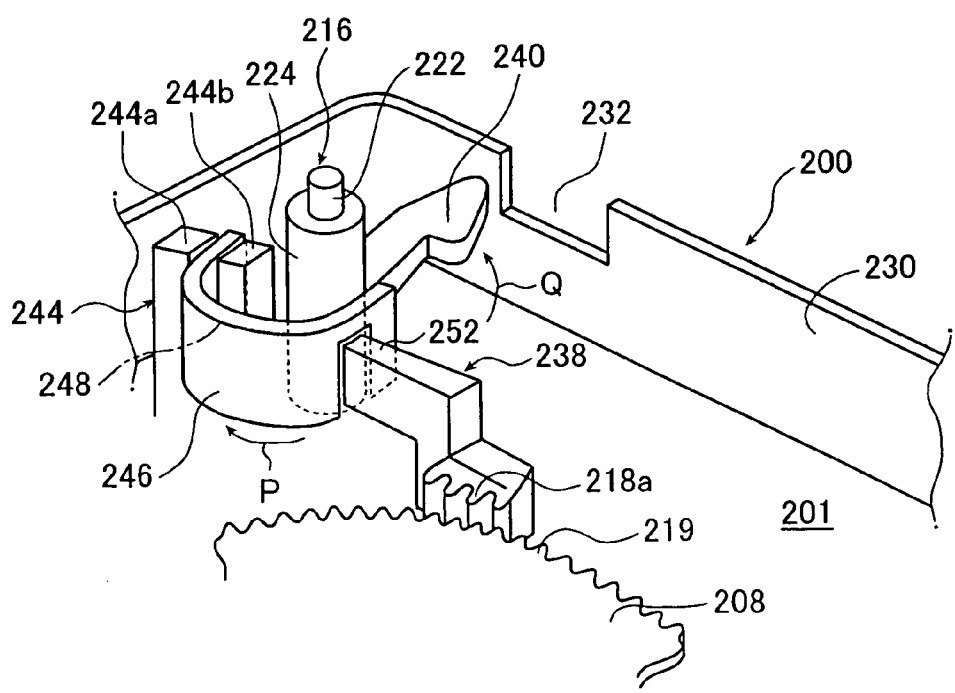
FIG. 7 is a construction example of a reel lock mechanism according to another embodiment of the magnetic tape cartridge of the present invention.

FIG. 7 is a diagram showing the construction of the reel lock member, the engagement teeth of the upper flange, the plate spring member and other related members in the magnetic tape cartridge of the second embodiment of the present invention, with the inner surface of the upper half facing upwards.

On the inner surface 230 of the upper half 200 of the magnetic tape cartridge shown in FIG. 7, there is arranged a reel lock member 216 having a cylindrical fitting shaft portion 224 rotatably fitted onto a center rod 222 standing upright on the inner surface 230, and a brake arm portion 238 and a braking releasing arm portion 240 protruding and extending radially outwards from the outer peripheral side wall of the fitting shaft portion 224.

The brake arm portion 238 protrudes from the outer peripheral side wall of the fitting shaft portion 224 so as to extend along the outer periphery of the upper flange 208 of the tape reel, and the braking releasing arm portion 240 protrudes from the outer peripheral side wall of the fitting shaft portion 224 so as to face an opening 232 provided in the side wall of the upper half 200. Further, at the forward end of the brake arm portion 238, there are formed braking claws 218a adapted to be engaged with engagement teeth 219 formed on the outer peripheral edge of the upper flange 208.

The reel lock member 216 of this embodiment is normally urged by a plate spring member 246 extending between an anchoring portion 244 standing upright on the inner surface 201 of the upper half 200 and the brake arm portion 238 such that the braking claws 218a are engaged with engagement teeth 219 of the upper flange 208.

Figure 8:
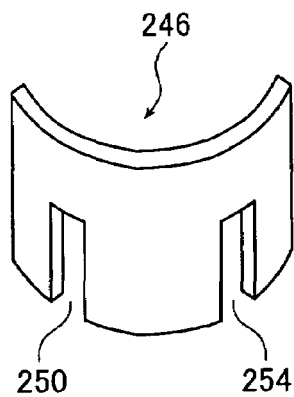
FIG. 8 is a detailed view of a plate spring member shown in FIG. 7.

As shown in FIG. 8, the plate spring member 246 is a plate-like resin member with a semi-arcuate sectional configuration capable of elastic deformation which has at its ends an anchoring cutout groove 250 adapted to be fitted onto a bridge portion 248 between two ribs 244a and 244b constituting the anchoring portion 244, and a braking cutout groove 254 crossing across an arm portion 252 of the brake arm portion 238 and fitted onto this arm portion 252.

In this reel lock member 216, the fitting shaft portion 224 is rotatably fitted onto the center rod 222, and the braking cutout groove 254 and the anchoring cutout groove 250 are respectively fitted onto the arm portion 252 of the brake arm portion 238 and the bridge portion 248 of the anchoring portion 244, whereby the plate spring member 246 is stretched between the anchoring portion 244 and the brake arm portion 238.

By rotation of the fitting shaft portion 224 using the center rod 222 as the rotation shaft in the direction reverse to the arrow P, the plate spring member 246 undergoes elastic deformation, whereby the braking claws 218a of the reel lock member 216 are urged toward the center axis of the upper flange 208 so as to be normally engaged with engagement teeth 219 of the upper flange 208, and rotation of the tape reel when the magnetic tape cartridge is not being used is regulated, thus preventing slackening of the magnetic tape.

When the magnetic tape cartridge is loaded to the recording/reproducing apparatus, a releasing means provided in the apparatus enters the case body through the opening 232 and pressurizes the braking releasing arm portion 240 to thereby rotate the reel lock member 216 in the direction of the arrow Q using the center rod 222 as the rotation shaft to release the engagement of the braking claws 218a and the engagement teeth 219, whereby the regulation of rotation of the tape reel is released, and the extraction or taking up of the magnetic tape by the recording/reproducing apparatus becomes possible.

When the magnetic tape cartridge is extracted from the recording/reproducing apparatus, the pressurization of the braking releasing arm portion 240 by the above-mentioned releasing means is released, and the reel lock member 216 is rotated by the elastic force of the plate spring member 246 using the center rod 222 as the rotation axis, whereby the braking claws 218a are engaged with engagement teeth 219. This helps to regulate rotation of the tape reel, and prevents slackening of the magnetic tape. By arranging such a reel lock mechanism at one or two or more positions of the inner surface of the upper half, it is possible to prevent slackening of the tape reel when the magnetic tape cartridge is not being used.

In assembling the magnetic tape cartridge having the reel lock mechanism as described above, the fitting shaft portion 224 of the reel lock member 216 is fitted onto the center rod 222, with the inner surface 201 of the upper half 200 facing upward, and the anchoring cutout groove 250 and the braking cutout groove 254 of the plate spring member 246 are respectively fitted onto the bridge portion 248 of the anchoring portion 244 and the arm portion 252 of the brake arm portion; further, while rotating the reel lock member in the direction of the arrow Q, the braking claws 218a are engaged with engagement teeth 219 of the upper flange 208, whereby it is possible to mount the reel lock mechanism, thus, facilitating the assembly operation.

When disassembling the magnetic tape cartridge, the plate spring member 246 is detached from the anchoring portion 244 and the brake arm portion 238 to remove the plate spring member 246, and the fitting shaft portion 224 is pulled out of the center rod 222, whereby it is possible to separate the reel lock member 216, thus facilitating the disassembly. Forming the plate spring member 246 of resin material is advantageous when separating the components into resin and metal materials for separate recovery for recycling.

The basic construction of the magnetic tape cartridge of the second embodiment of the present invention is as described above.

Next, a magnetic tape cartridge according to a third embodiment of the present invention will be described with reference to FIGS. 9 through 12 and FIGS. 16 through 19.

In this embodiment, the members or components which are the same as those of the two-reel type magnetic tape cartridge shown in FIG. 16 may be comprised of the same or different members or components. In the following, a detailed description of such members or components will be omitted, and the description will be focused on the components of the reel lock mechanism and the lid lock mechanism. Of course, this should not be construed restrictively.

Figure 9:
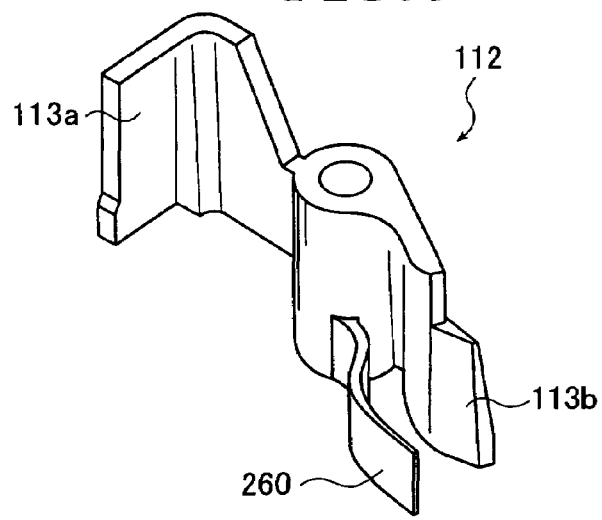
FIG. 9 is an enlarged perspective view of a reel lock component used in another embodiment of the magnetic tape cartridge of the present invention.
Figure 10:
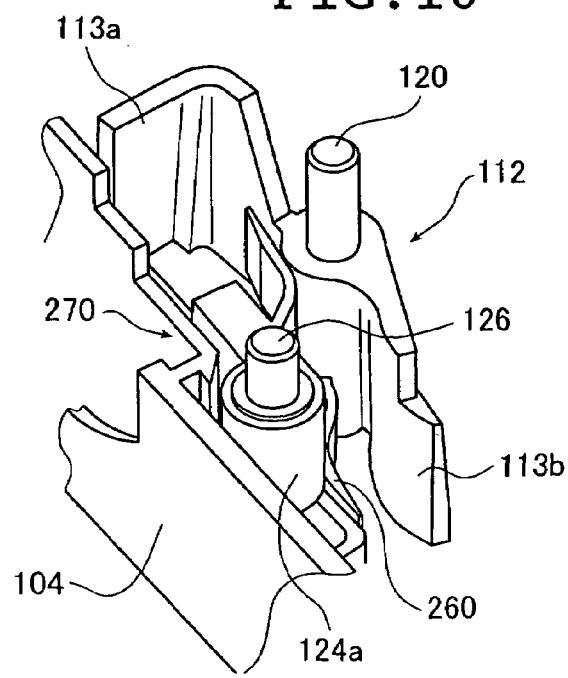
FIG. 10 is a diagram showing how the reel lock component shown in FIG. 9 is arranged at a predetermined position in a lower half.

FIG. 9 is an enlarged perspective view of a component (hereinafter referred to as the "reel lock component") obtained by forming a reel lock member and a reel lock member urging means into an integral unit using resin, which is used in the magnetic tape cartridge of the third embodiment of the present invention. FIG. 10 is a diagram illustrating how this reel lock component is placed at a predetermined position in the lower half.

In FIGS. 9 and 10, reference numerals 104, 113a, 113b, 120, 124a, and 126 indicate components (or portions thereof) which are the same as the components (or portions thereof) shown in FIGS. 16 through 19. Reference numeral 112 indicates a reel lock component used in the magnetic tape cartridge of this embodiment, and reference numeral 260 indicates a reel lock spring formed integrally therewith so as to extend from the central portion of the reel lock component 112, constituting a main portion thereof.

Reference numeral 270 indicates a lid lock component used in the magnetic tape cartridge of this embodiment. As described below, like the above-described reel lock component 112, this lid lock component 270 is equipped with a lid lock spring formed integrally therewith so as to extend from the central portion thereof.

As in the case of the above-described reel lock component 112*b*, the central large diameter portion of the reel lock component 112 is fitted onto a pin 120, and is supported so as to be rotatable around the pin 120. In this state, the reel lock component 112 is formed to press the reel lock spring 260 against the lid lock component 270 (more specifically, the central large diameter portion thereof), whereby it urges itself so as to move away from the lid lock component 270.

Due to the provision of the reel lock spring 260 thereon, in the reel lock component 112 of this embodiment, constructed as described above, completely the same function as that in the case of the conventional reel lock member 112*b* (See FIG. 18) is realized without having to provide the metal coil spring 122 for urging the braking claw 113*b* so as to engage it with an engagement tooth 107 of the reel 106*b*.

This function is realized by the reel lock spring 260 integrally formed on the reel lock component 112, whereby there is no need to provide the metal coil spring 122. That is, in this embodiment, by using this reel lock component 112, it is possible to simultaneously achieve a reduction in the number of parts and a reduction in assembly man-hours. Further, it is greatly advantageous in that it easily allows disassembly at the time of disposal, and that it helps to reduce the components requiring separation.

Figure 11:
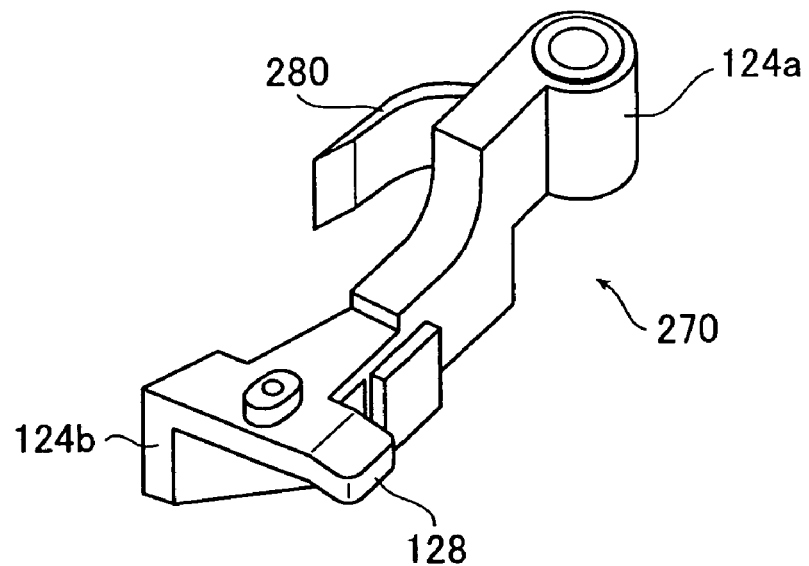
FIG. 11 is an enlarged perspective view showing a lid lock component used in another embodiment of the magnetic tape cartridge of the present invention.
Figure 12:
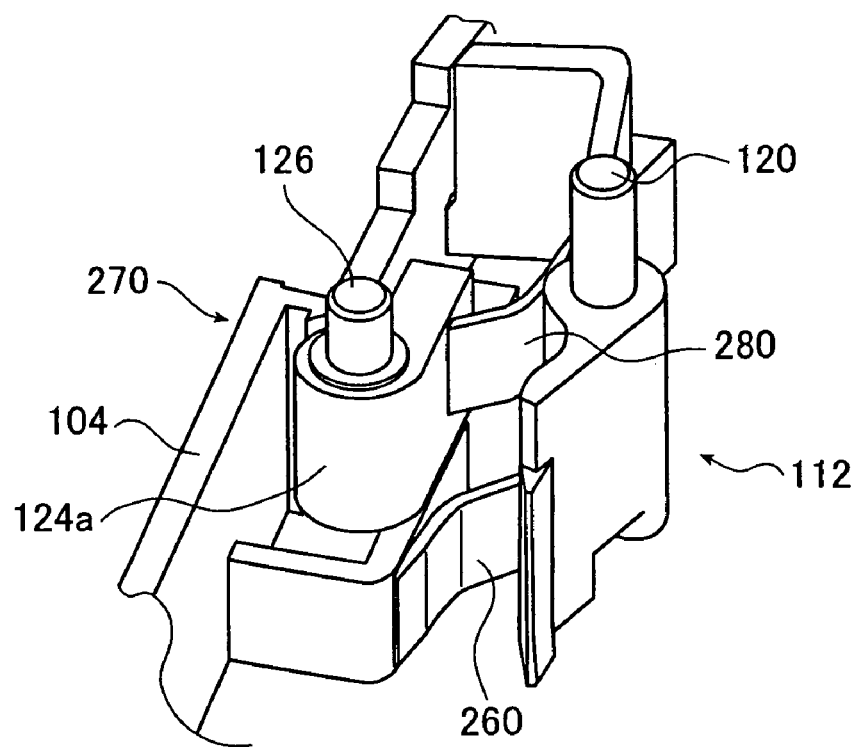
FIG. 12 is a diagram showing how the lid lock component shown in FIG. 11 is arranged at a predetermined position in a lower half.

FIG. 11 is an enlarged perspective view showing a component (hereinafter referred to as the lid lock component) which is also used in the magnetic tape cartridge of this embodiment and which is obtained by forming a lid lock member and a lid lock member urging means into an integral unit by using resin. FIG. 12 is a diagram illustrating how this lid lock component is placed at a predetermined position in the lower half.

In FIGS. 11 and 12, reference numerals 104, 120, 124*a*, 124*b*, and 126 indicate components (or portions thereof) which are the same as the components (or portions thereof) which are shown in FIGS. 16 through 19. Reference numeral 112 indicates a reel lock the reel lock component shown in FIGS. 9 and 10, reference numeral 260 indicates a reel lock spring constituting a main portion thereof, and reference numeral 270 indicates a lid lock component. Like the above-described reel lock component 112, the lid lock component 270 of this embodiment is equipped with a lid lock spring 280 formed integrally therewith so as to extend from the central portion thereof.

The central large diameter portion of the lid lock component 270 is fitted onto a pin 126, and is supported so as to be rotatable around the pin 126. In this state, the lid lock component 270 presses the lid lock spring 280 against the above-described reel lock component 112 (more specifically, the central large diameter portion thereof), whereby it urges itself so as to move away from the reel lock component 112.

As in the conventional lid lock member 124, in the lid lock component 270 of this embodiment constructed as described above, the lid lock key 128 thereof is usually engaged with the lid lock hole 118 of the lid 110 to thereby regulate rotation of the lid 110.

This function is realized by the lid lock spring 280 formed integrally with the lid lock component 270, whereby there is no need to provide the metal coil spring 122. That is, in this embodiment, by using the lid lock component 270, it is possible to achieve a reduction in the number of parts and a reduction in assembly man-hours; further, it is greatly advantageous in that it easily allows disassembly at the time of disposal, and that it helps to reduce the components requiring separation.

In the lid lock mechanism of this embodiment, the lid lock component (more specifically, the lid lock key 128 thereof) is urged by the lid lock spring 280 in a direction parallel to the bottom surface of the magnetic tape cartridge, that is, in the horizontal direction, whereas the lid rotates in a direction perpendicular thereto, i.e., in a vertical plane, so that, even if a relatively weak plastic spring is used, it is advantageously possible to realize a sufficiently reliable lid lock.

The basic construction of the magnetic tape cartridge of the third embodiment is as described above.

Next, a magnetic tape cartridge according to a fourth embodiment of the present invention will be described with reference to FIGS. 13 through 15 and 22. Of course, this should not be construed restrictively.

Figure 13:
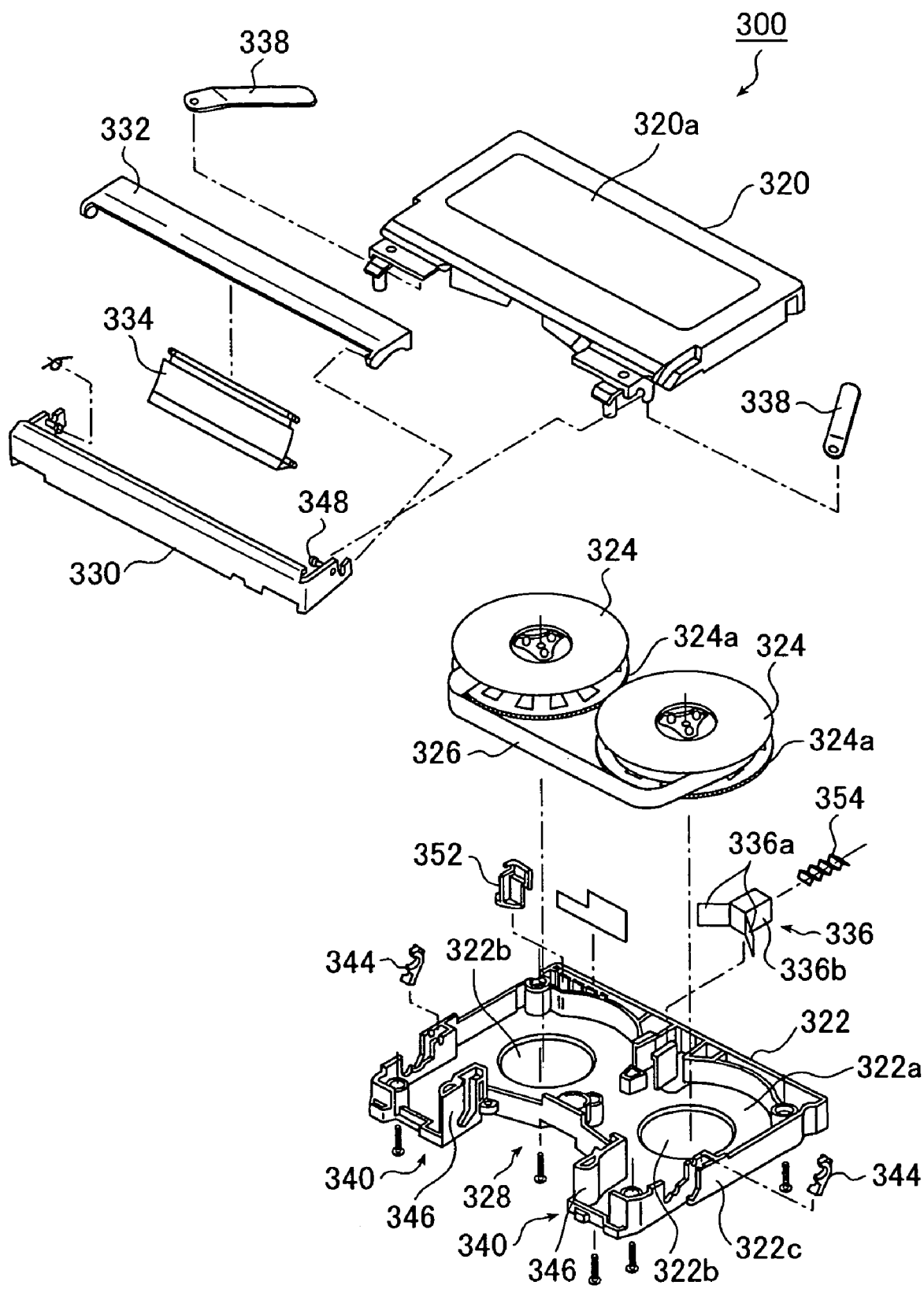
FIG. 13 is an exploded perspective view schematically showing the construction of another embodiment of the magnetic tape cartridge according to the present invention.
Figure 17:
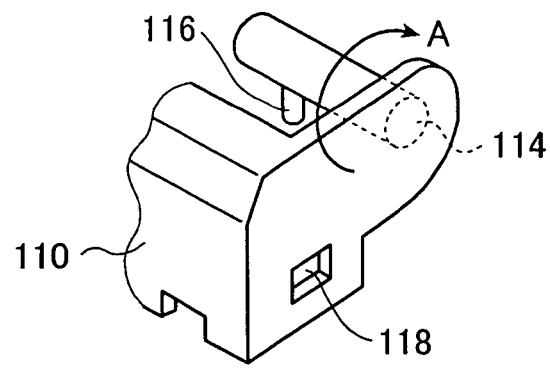
FIG. 17 is an enlarged perspective view of a portion of the lid shown in FIG. 16.
Figure 18:
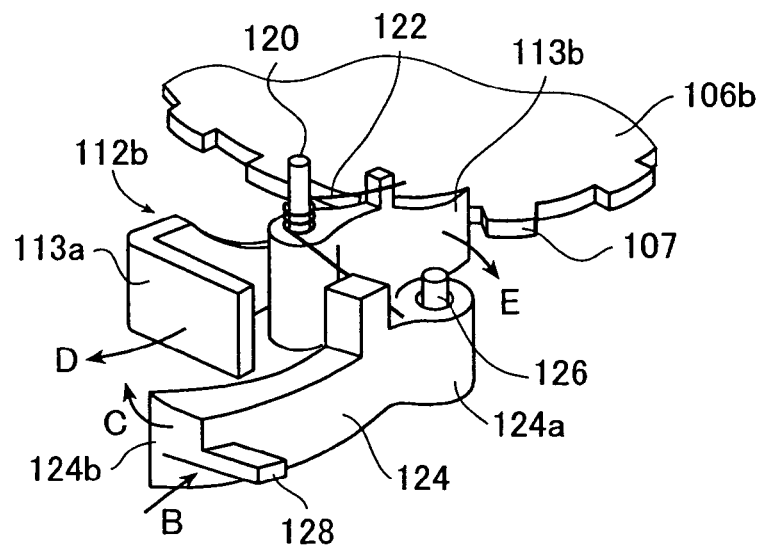
FIG. 18 is an enlarged perspective view of the reel lock member and the lid lock member shown in FIG. 16.
Figure 19:
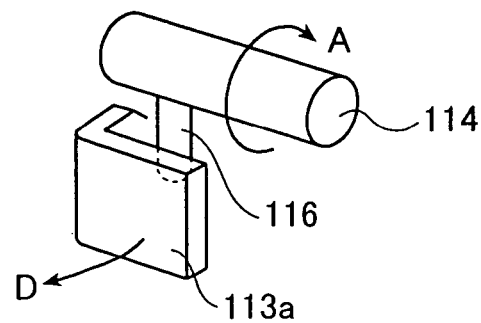
FIG. 19 is an enlarged perspective view of a shaft portion of the lid shown in FIGS. 17 and 18.

FIG. 13 is an exploded perspective view showing the general construction of a magnetic tape cartridge according to the fourth embodiment of the present invention.

Figure 22:
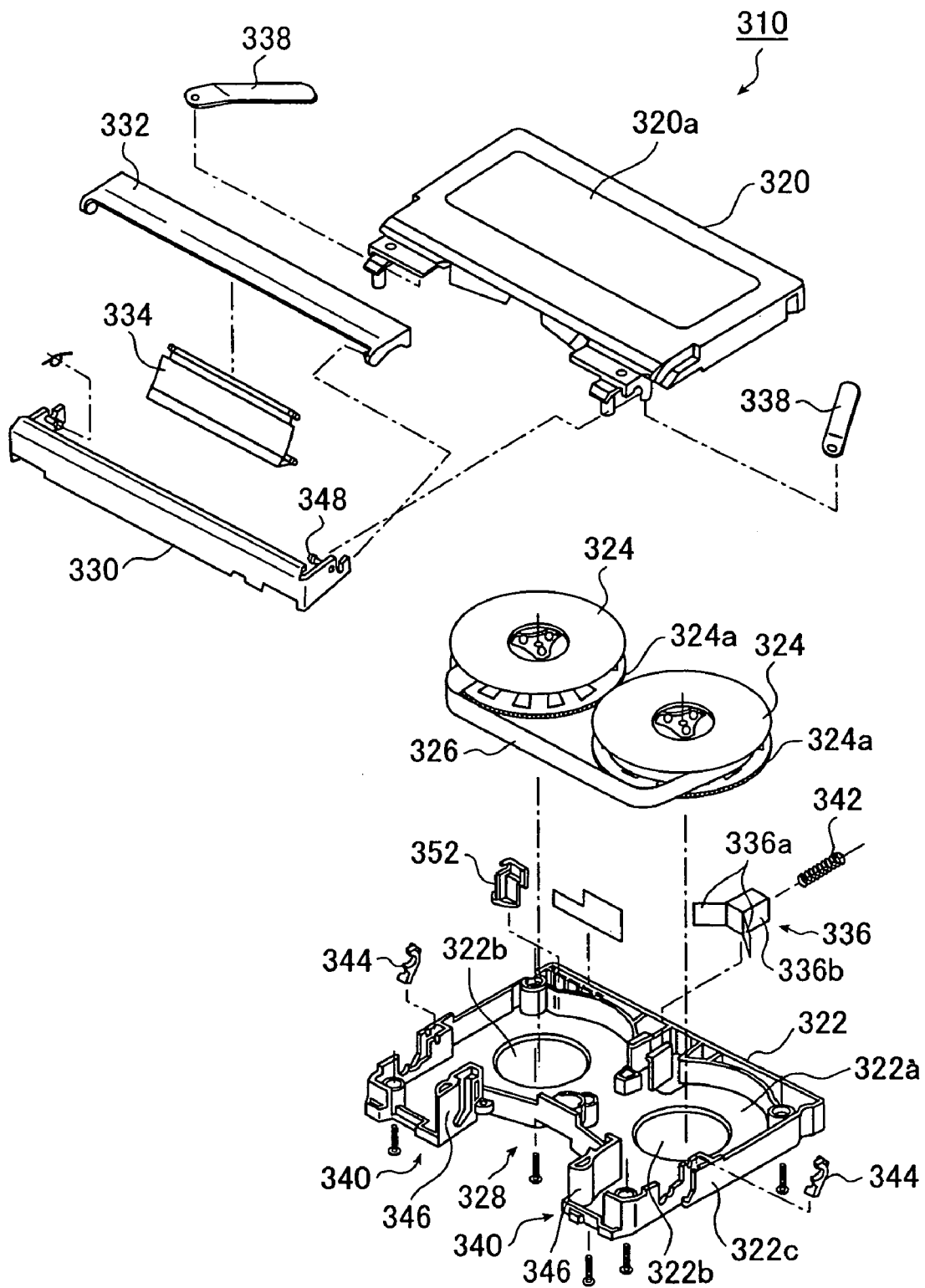
FIG. 22 is an exploded perspective view schematically showing the construction of another conventional magnetic tape cartridge.

The magnetic tape cartridge of this embodiment shown in FIG. 13 has the same construction as the above-described two-reel type magnetic tape cartridge shown in FIG. 22 except for the construction of the reel lock spring constituting the reel lock member urging means. Thus, the components which are the same as those shown in FIG. 22 will be indicated by the same reference numerals, and a detailed description of such components will be omitted.

A magnetic tape cartridge 300 shown in FIG. 13 is obtained by using, in the magnetic tape cartridge 310 shown in FIG. 22, a resin reel lock spring 354 instead of the compression coil spring 342 constituting the reel lock spring.

That is, in the magnetic tape cartridge 300 of this embodiment, there is provided in the rear end side of the lower half 322 (the back side in the drawing) a reel lock mechanism having a reel lock member 336, a resin reel lock spring 354, and guide ribs for slidably supporting the reel lock member 336.

In this reel lock mechanism, the reel lock member 336 has tape reel anchoring arms 336*a* and a slide body portion 336*b*, and is mounted to the rear end (the back side in the drawing) of the lower half 322. The slide body portion 336*b* of the reel lock member 336 is slidably held between a pair of guide ribs standing upright on the bottom surface 322*a* of the lower half 322.

As described below, this reel lock member 336 is urged by the spring (resin reel lock spring) 354 characterizing this embodiment, whereby the tape reel anchoring arms 336*a* are engaged with engagement teeth 324*a* formed in the outer peripheries of the lower flanges of the tape reels 324 to thereby prevent inadvertent rotation of the tape reels 324, thereby preventing slackening, etc. of the magnetic tape 326.

FIG. 14 is an enlarged perspective view of the resin reel lock spring characterizing the magnetic tape cartridge of this embodiment. Here, the components that are not directly pertinent are omitted. In the following description, the general construction of the above-described magnetic tape cartridge will be omitted, and the description will be focused on the main points.

In FIG. 14, the portion indicated by the arrow R is a reel lock member accommodating portion, and the reel lock member 336 is guided to slide between the two ribs standing upright on the bottom surface 322a of the lower half 322. And, as described above, the tape reel anchoring arms 336a of this reel lock member 336 are urged in the direction of the engagement teeth 324a formed in the outer peripheries of the lower flanges of the tape reels 324 by the resin reel lock spring (hereinafter referred to as the plastic spring) 354.

The plastic spring 354 is accommodated in the reel lock member accommodating portion R together with the reel lock member 336. Conventionally, a metal compression spring has been arranged at this position, so that, to extract this, it has been necessary to first dismantle (or disassemble) at least the upper and lower halves of the magnetic tape cartridge, extracting the compression coil spring in this state.

However, it is no good to perform this operation, i.e., the dismantling (or disassembling) of the upper and lower halves, solely for the purpose of extracting the compression coil spring; in view of this, in this embodiment, the reel lock spring 354 is formed of plastic, making it unnecessary to extract it for the purpose of separate recovery.

Specifically, in this case, a reel lock spring 354 comprised of a plate-like plastic sheet is accommodated in the reel lock spring accommodating portion formed by ribs on the bottom surface and the side surfaces of the lower half of the above-mentioned reel lock member accommodating portion R; by appropriately selecting the material of this plastic sheet, it is possible to put the reel lock spring 354 on the same recovery route as the upper and lower halves, without having to extract it from the upper and lower halves.

FIGS. 15A and 15B show in detail the reel lock spring 354 mentioned above. The reel lock spring 354 of this embodiment is formed by folding a plastic sheet of polycarbonate (PC) or the like having an appropriate thickness (FIG. 15A shows folding in a narrow sense; and FIG. 15B shows folding with curves); by placing this in a passage regulated on the right and left and the upper and lower sides for use, a spring functioning as a one-dimensional compression spring is realized.

In the above-described embodiment, the reel lock spring of the magnetic tape cartridge is formed of resin, whereby there is no need to extract the reel lock spring 354 at the time of disposal; this does not involve a deterioration in the assembly efficiency of the magnetic tape cartridge, nor does this change in structure adversely affect the basic performance of the magnetic tape cartridge.

In this embodiment, in which the reel lock spring is formed of resin, the resin reel lock spring 354 separately formed is incorporated when assembling the cartridge, and there is no need to disassemble the cartridge main body at the time of disposal after use; the spring can be put as it is on the recovery route for the cartridge main body, etc. Thus, the above construction can be realized through a formation process which is substantially the same as the conventional process.

While in this embodiment polycarbonate is used as the resin forming the resin reel lock spring, this should not be construed restrictively. Apart from polycarbonate, various other resin materials can be used including the resin that can be used in the fourth embodiment of the present invention.

The basic construction of the magnetic tape cartridge of the fourth embodiment of the present invention is as described above.

The various embodiments of the recording tape cartridge of the present invention, described in detail above, should not be construed restrictively. Various improvements and modifications are naturally possible without departing from the scope of the invention.

As described in detail above, the first embodiment of the present invention provides a marked effect of facilitating incorporation of the reel lock spring and separated recovery.

The second embodiment of the present invention provides a marked effect of facilitating the assembly and mounting of the reel lock member and the reel lock member urging means constituting the reel lock mechanism, for example, the plate spring member, and being advantageous in performing separate recovery of the resin materials for recycling purposes.

In accordance with the third embodiment of the present invention, the urging springs of the reel lock mechanism and/or the lid lock mechanism, which have conventionally been formed of metal, are formed of the same plastic material as that of the main members of the reel lock mechanism and/or the lid lock mechanism, whereby a reduction in assembly man-hours is achieved, and it is possible to realize a recording tape cartridge free from the work of material separation at the time of disposal.

According to the fourth embodiment of the present invention, the reel lock spring of the recording tape cartridge is formed of resin, whereby even at the time of disposal after use, it is not always necessary to disassemble the recording tape cartridge, thus providing a marked effect of simplifying the operation of material separation at the time of disposal.

Further, according to the present invention, the construction of the reel lock mechanism for preventing inadvertent rotation of the tape reel around which the recording tape is wound is improved, thereby providing a marked effect of reducing the assembly man-hours and making it possible to realize a recording tape cartridge free from the bother of material separation at the time of disposal.

Furthermore, the present invention provides a marked effect of making it possible to realize a recording tape cartridge which can be assembled with an efficiency not lower than that for the conventional recording tape cartridge and whose case body is formed of many resin parts that are advantageous in separating them into different materials for separate recovery.

What is claimed:

1. A recording tape cartridge comprising:
   a case body formed by joining together an upper half and a lower half;
   a tape reel which is accommodated in the case body and around which a recording tape is wound;
   a fitting shaft portion rotatably fitted onto a center rod standing upright on an inner surface of said upper half;
   reel lock member formed by providing radially on an outer peripheral surface of said fitting shaft portion a brake releasing arm portion and a brake arm portion having at its top end a braking claw to be engaged with an engagement tooth formed in a peripheral edge of an upper flange of said tape reel; and
   reel lock member urging means which is provided so as to extend between an anchoring portion standing upright on the inner surface of said upper half and said brake arm portion and which is adapted to urge said reel lock member so as to cause said braking claw to be engaged with said engagement tooth,
   wherein said anchoring portion comprises two rib portions connected therebetween by a bridge portion, and said reel lock member urging means is fitted to said bridge portion and said brake arm portion respectively.

2. The recording tape cartridge according to claim 1, wherein said reel lock member urging means is a reel lock spring comprising of a plate spring member.

3. The recording tape cartridge according to claim 2, wherein said plate spring member has a first and second cutout portion, such that said first cutout portion fits across said bridge portion of said anchoring portion and said second cutout portion fits across said brake arm portion.

4. The recording tape cartridge according to claim 2, wherein said reel lock member urging means is a plate-like resin member with a semi-arcuate sectional configuration capable of elastic deformation.

5. The recording tape cartridge according to claim 1, wherein said braking releasing arm portion of said reel lock member is arranged so as to face an opening formed in a side wall of said upper half and wherein, when said recording tape cartridge is loaded to a recording/reproducing apparatus, releasing means on a side of the recording/reproducing apparatus enters through the opening and is pressurized to thereby release engagement of said engagement tooth and said braking claw by said reel lock member.

* * * * *